United States Patent [19]
Freund

[11] Patent Number: 5,897,224
[45] Date of Patent: Apr. 27, 1999

[54] SEALING ARRANGEMENT FOR SHUTTER RELEASE AND FILM TRANSPORT CONTROL IN A PHOTOGRAPHIC CAMERA

[75] Inventor: Michael N. Freund, Stuttgart, Germany

[73] Assignee: Eastman Kodak Company, Rochester, N.Y.

[21] Appl. No.: 08/877,383

[22] Filed: Jun. 17, 1997

[30] Foreign Application Priority Data

Jul. 2, 1996 [DE] Germany .............. 196 26 578

[51] Int. Cl.⁶ .................. G03B 17/08; G03B 17/38
[52] U.S. Cl. .................. 396/25; 396/27; 396/502
[58] Field of Search .................. 396/25, 27, 29, 396/502, 535

[56] References Cited

U.S. PATENT DOCUMENTS

| | | | |
|---|---|---|---|
| 3,502,013 | 3/1970 | Shimoda | 396/535 |
| 3,653,306 | 4/1972 | Takahama | 396/29 |
| 4,097,878 | 6/1978 | Cramer | 396/27 |
| 4,265,523 | 5/1981 | Defuans | 396/29 |
| 4,281,837 | 8/1981 | Hashimoto | 396/29 |
| 5,602,604 | 2/1997 | SanGregory | 396/25 |

FOREIGN PATENT DOCUMENTS

| | | |
|---|---|---|
| 1 597 274 | 11/1970 | Germany. |
| 29 43 003 C2 | 4/1982 | Germany. |

Primary Examiner—Eddie C. Lee
Attorney, Agent, or Firm—Robert Luke Walker

[57] ABSTRACT

The invention relates to a sealing arrangement for a shutter release and film transport control element of a photographic camera, having an outer watertight body which has an opening for receiving the shutter release and film transport control element using which a rotational film transport and a transversal shutter release movement can be transmitted to corresponding control elements of a camera arranged inside said body, where a single one-piece sealing element is provided for transmitting the shutter release and film transport movement, by which sealing element the opening can be sealed watertight.

23 Claims, 3 Drawing Sheets

SEALING ARRANGEMENT FOR SHUTTER RELEASE AND FILM TRANSPORT CONTROL IN A PHOTOGRAPHIC CAMERA

FIELD OF THE INVENTION

The invention relates to a sealing arrangement for a shutter release and film transport control element in accordance with the preamble of claim 1. To protect cameras from sand and moisture and even make them usable for underwater operation, careful designs are necessary for sealing those controls leading to the outside of the camera, as for a film transport and release control element of the camera.

BACKGROUND OF THE INVENTION

Conventional designs for moving components of this type usually have an O-shaped sealing ring arranged in the wall of a body enclosing the camera in order to keep out sand and moisture, with the shank of one of the operating elements being passed through the sealing ring opening. Due to the geometry of the sealing ring however, only a small contact surface at the body wall and at the shaft is achieved, and is not sufficient for reliable sealing against water under pressure.

An improved sealing arrangement is known from DE 29 43 003 C2 in which the contact surface of the seal is substantially enlarged. To do so, a sleeve arranged in a stepped hole of a body enclosing the camera and firmly connected to the step is used. Inside the sleeve, a shank of an operating control element is guided and has an area with a reduced diameter. An elastic and L-shaped material is firmly connected to this shank in that area. The enlarged contact surface results from the wide-area contact of the L-shaped material by its long leg with the shank and additionally by its short leg with the end face of the sleeve. To retain the ease of movement of the operating element, however, the sleeve is made of Teflon, which has a low friction resistance.

The drawback of such designs is that the contact surfaces, i.e. the two sealing surfaces themselves for transmitting the rotational or translational movement from the outside operating elements to those of the camera arranged inside the casing, are exposed to water.

An improvement in respect of this feature is known from DE-AS 15 97 274, which describes a pressure-proof body for a camera in which the shank of the release is covered by a gaiter-like covering and affixed to the camera casing. However, a seal of this type is not suitable for rotating operating elements, for example film transport devices.

SUMMARY OF THE INVENTION

The object underlying the invention is to provide a dependable watertight sealing arrangement for a photographic camera with which translational and rotational movements can be transmitted from the outside of the camera to the inside.

This object is achieved in accordance with the invention by the features in claim 1.

Since only a single one-piece element is provided for transmitting a translational and a rotational movement for the film transport and shutter release movement from a film transport and shutter release control element arranged in an opening of an outer body enclosing the camera, said control element being connected watertight to the outer casing, for example glued, it is no longer necessary to provide other penetrations for rotating or sliding elements. As a result, a hermetic seal between the outside and the inside of the body is achieved, with the transmission of the film transport and release movement being effected by the flexibility of the element.

Since the sealing element is formed from a flexible, circular diaphragm portion made of elastic polymer material and from a cylindrical pin portion made from a rigid polymer material, the use of a multi-component injection molding process makes the manufacture of the sealing element extremely inexpensive and rapid. In particular, the otherwise usual high dimensional accuracy necessary for the mutually sealing elements is dispensed with. Additional working steps necessitating the connection of these parts to one another, as given in DE-AS 15 97 274, are likewise no longer necessary, since as a result of chain looping of the polymer materials a good grip between the diaphragm portion and the pin portion is achieved.

Furthermore, the material of the diaphragm portion is additionally strengthened in the connection areas to the pin portion, so that the diaphragm load is reduced by twisting of the diaphragm resulting from the film transport and shutter release movement, without substantially hindering the easy action of the operating elements.

BRIEF DESCRIPTION OF THE DRAWINGS

Further details and advantages are shown in the subclaims and in a design example that is explained in detail on the basis of the figures.

DETAILED DESCRIPTION OF THE INVENTION

Figure 1:
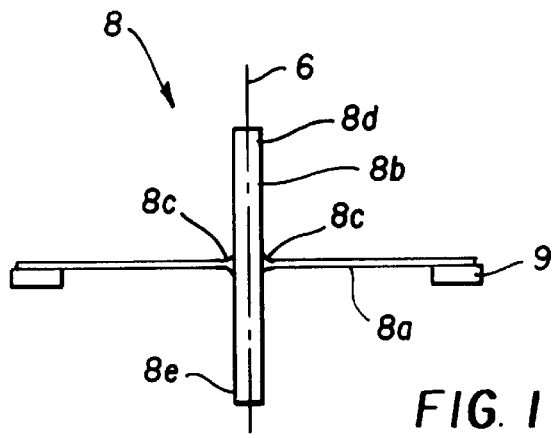
FIG. 1 is a diagrammatic cross-sectional view of a sealing element of the sealing arrangement in accordance with the invention in a relaxed or rest position.
Figure 2:
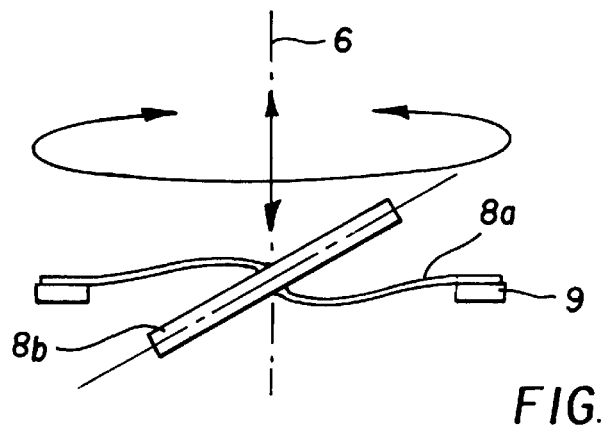
FIG. 2 is a diagrammatic cross-sectional view of a sealing element of FIG. 1 in the installed position.

As shown in FIGS. 1 and 2, the sealing arrangement in accordance with the invention has a one-piece sealing element 8 formed from a flexible circular diaphragm portion 8a and a rigid cylindrical pin portion 8b. The diaphragm portion 8a comprises a thermoplastic elastomer, preferably a styrene-butadiene (ISO designation: (TE(PEBBS+PP)) and the pin portion 8b of polystyrene, both parts being made in a multi-component injection molding process (2K method).

Due to the cross-linking processes in the form of chain looping (molecular entanglement) of the molecular chains of both polymer materials occurring during manufacture, adequate grip between both materials is achieved. From the injection molding viewpoint, first the pin portion 8b is made and then, without the part being removed from the injection mold, the diaphragm portion is cast onto/around the pin portion. As shown in FIG. 1, the pin portion 8b is arranged vertical to the surface normal, i.e. in the axis direction 6 and centrically in the circular diaphragm portion 8a when the sealing element is in a relaxed or rest position.

Figure 4:
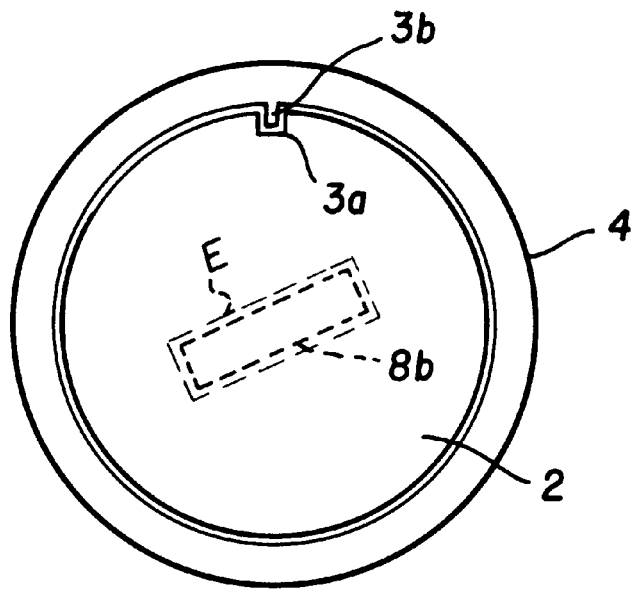
FIG. 4 is a diagrammatic sectional plan view of the thumbwheel and release of the sealing arrangement of FIG. 3 (for clarity, some features of the drawing are not to scale and the pin portion and the elastic polymer material of the diaphragm portion are indicated by a pair of interposed rectangular dashed lines (the elastic polymer material of the diaphragm portion is illustrated diagrammatically and should not be understood to show features otherwise undisclosed)
Figure 5:
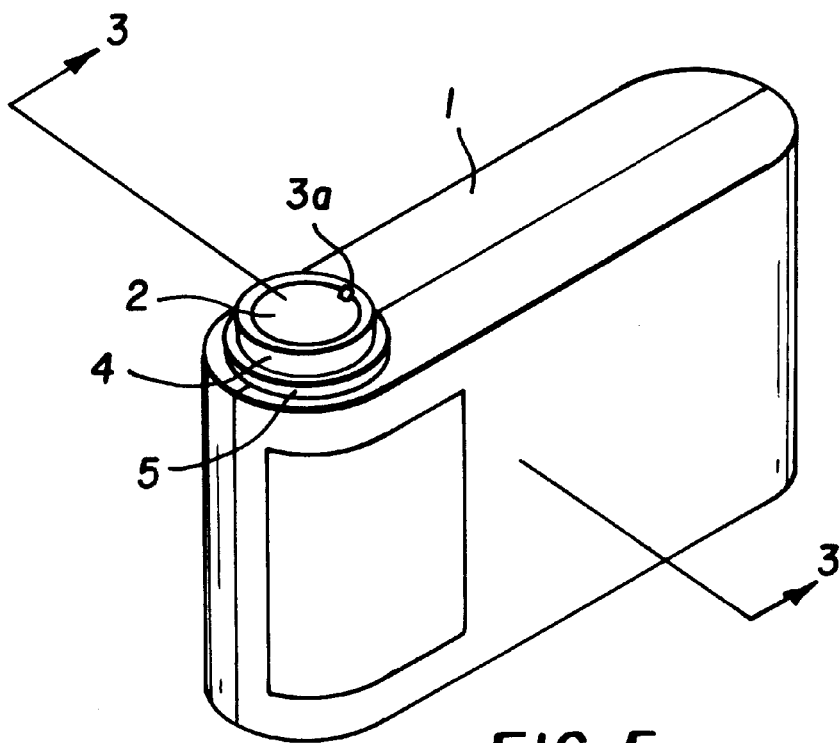
FIG. 5 is a perspective view of the sealing arrangement of FIGS. 1–4.

The thermoplastic elastomer of the diaphragm portion 8a can completely enclose the pin portion 8b (the elastic polymer material of the diaphragm portion is indicated by the letter "E" in FIG. 4) or, leave the two ends 8d and 8e of the pin portion 8b free. In the connecting area 8c to the pin portion 8b, the material thickness tapers out by about 0.2 mm, with the overall thickness of the diaphragm portion ranging from 0.2 to 0.8 mm. To ensure an easier movement of the operating elements for the film transport and shutter release, the pin portion 8b can in addition to a fully cylindrical form also be designed as a hollow cylinder.

Figure 6:
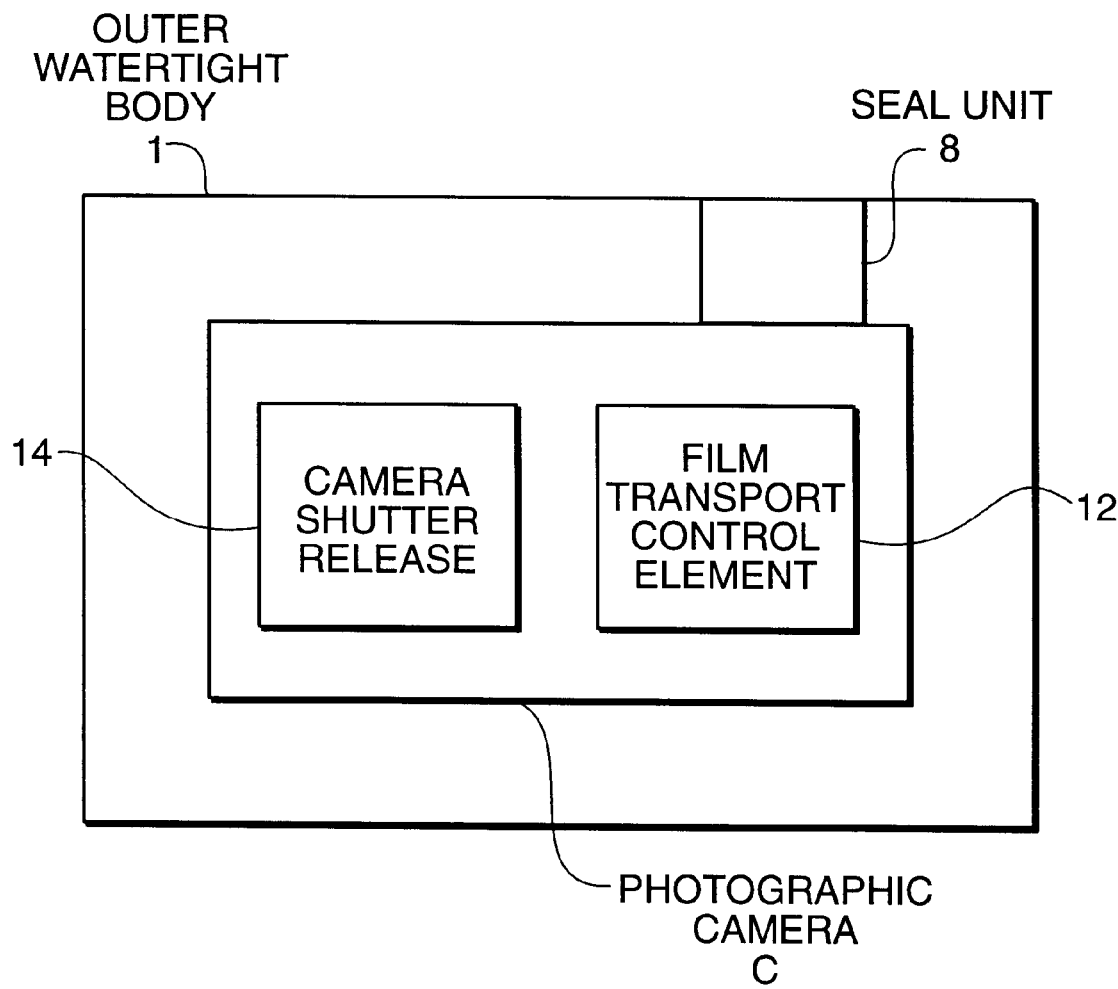
FIG. 6 is a diagrammatical view of the sealing arrangement, showing the photographic camera arranged inside the body; the photographic camera having a camera shutter release and film transport control element. The seal unit is also shown. Since this view is diagrammatical, it should not be understood to show features otherwise undisclosed.

The sealing arrangement 10 includes a watertight casing or body 1 and a photographic camera. The body 1 is provided with an opening 1a and encloses a photographic camera. A body shutter and release control element 10a is on the outside of the body. A camera shutter and release control element 10b is on the watertight inside. The camera, indicated by the letter "C", is shown diagrammatically in FIG. 6.

The body 1 has an integrally molded, hook-like retaining element 5 designed as a ring and engaging in an all-round groove 5a of a circular thumbwheel 4 of element 10a, to retain it. As FIG. 4 shows, a release 2 is arranged in the thumbwheel 4 that has on the circumferential side a groove 3a not continuous radially, into which engages a stud 3b arranged on the inside of the thumbwheel 4 in order to hold it and to transmit a rotational movement of the thumbwheel to the release. The release 2 is therefore also held for a translational movement, i.e. a movement along the axis 6 corresponding to the vertical arrow direction in FIG. 2. Inside the release 2, a hole 7a for receiving the pin portion 8b at its end 8d is provided at an angle α of 45° to the axis 6. The hole diameter and depth are here selected such that in line with the design variant of the pin portion achieved by injection molding methods, a reliable mounting of one of the ends 8d or 8e of the pin portion is assured.

For watertight sealing of the opening 1a, the sealing element 8 is connected to the body 1 in a circular ring 9 around the entire circumference, as shown in FIG. 1. The connection is achieved by gluing or welding.

Figure 3:
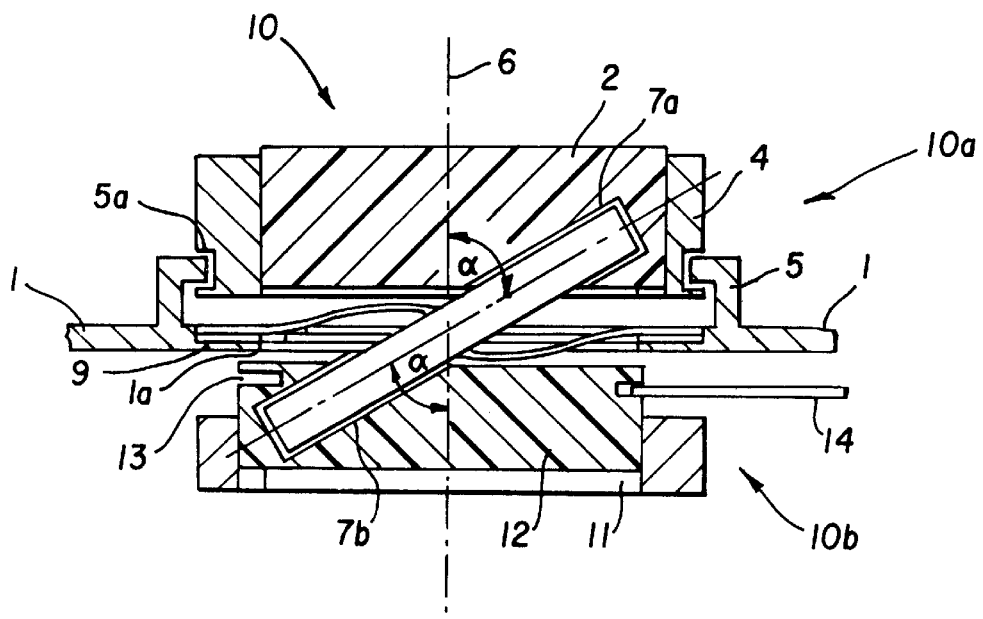
FIG. 3 is a diagrammatic, partial cross-sectional view taken substantially along line 3—3 of FIG. 5, of the sealing arrangement including the sealing element of FIG. 1.

As shown in FIG. 3, an element or release 12 with a thumbwheel 11 of element 10b is arranged on the watertight inside of the casing. The element 12 is rotatably mounted and connected to the thumbwheel 11 by means of connecting elements, not shown. The mode of operation and the design of the above camera parts for a camera known per se, to the extent that they do not relate to the invention, are not described since they are known to a person skilled in the art.

The element 12 has, corresponding to the "outer" release 2, a hole 7b of identical size and angle a for receiving the pin end 8e. The rotational movement of the element 12 is additionally limited by the film transport device of the camera. A connecting element 14 engages in a groove 13 located on the outer circumference of the release 12, and is connected to the release mechanism of the camera and effects the release proper of the aperture shutter of the camera.

If the thumbwheel 4 is rotated for film transport purposes, the release 2 is also rotated by the groove/stud connection 3a and 3b. A spatial rotational movement within the elasticity limit of the part and in accordance with the circular arrow direction shown in FIG. 2 takes place with the pin portion 8b inserted into the holes 7a and 7b, such that the camera's thumbwheel 11 connected to the element 12 is also turned and the film is transported by the transport device of the camera.

If the release process is effected by pressing of the release 2 along the axis 6, as shown in FIG. 2, this transversal movement is transmitted via the center of the pin portion 8b and the diaphragm portion 8a to the element 12, which similarly performs this movement and operates the camera release via the connecting element 14. A rotation of the element 12 does not lead here to any effect on the release-transmitting connecting element 14, since the latter is in the groove 13.

What is claimed is:

1. Sealing arrangement comprising:
    an outer watertight body having an opening and a body shutter-release-and-film-transport-control element received by said opening, said body shutter-release-and-film-transport-control element being capable of a rotational film transport and transversal shutter release movement;
    a photographic camera arranged inside said body, said photographic camera having a camera shutter-release-and-film-transport-control element;
    a single, one-piece sealing element transmitting said rotational film transport and transversal shutter release movement from said body shutter-release-and-film-transport-control element to said camera shutter-release-and-film-transport-control element, said sealing element sealing said opening watertight;
    wherein said sealing element has a flexible circular diaphragm portion comprising elastic polymer material and a cylindrical pin portion comprising a rigid polymer material.

2. Sealing arrangement according to claim 1, wherein said shutter-release-and-film-transport-control elements each have a hole, and said pin portion has opposed first and second ends engaged in respective said holes.

3. Sealing arrangement according to claim 2 wherein said shutter-release-and-film-transport-control elements define an axis, and said holes are disposed at an angle α in relation to said axis when said sealing element is in an installed position.

4. Sealing arrangement according to claim 3, wherein said pin portion is disposed centrally in said diaphragm portion and vertical to a surface normal defined by said diaphragm portion when said sealing element is in a rest position.

5. Sealing arrangement according to claim 4, wherein the elastic polymer material of said diaphragm portion encloses said pin portion completely and said diaphragm portion is strengthened in a connection area adjoining said pin portion.

6. Sealing arrangement according to claim 2, wherein said body shutter-release-and-film-transport-control element further comprises a circular thumbwheel and a release disposed in said thumbwheel, said release being movable both translationally and rotationally relative to said body.

7. Sealing arrangement according to claim 2, characterized in that said holes are provided symmetrically in identical size at an angle α in relation to the surface normal of said body.

8. Sealing arrangement according to claim 1, characterized in that an element connected to said camera shutterrelease-and-film-transport-control element is guided in a groove running all round the circumference side of said camera shutter-release-and-film-transport-control element such that a rotational movement of said camera shutter-release-and-film-transport-control element does not lead to shutter operation.

9. Sealing arrangement for use with a photographic camera having a camera shutter-release-and-film-transport-control element, the sealing arrangement comprising:

an outer watertight body within which the camera can be disposed, the body having an opening;

a body shutter-release-and-film-transport-control element received by the opening, the body shutter-release-and-film-transport-control element being capable of a rotational film transport and a transversal shutter release movement; and a one-piece sealing element transmitting said shutter release and film transport movement to the camera shutter-release-and-film-transport-control element inside the body, and sealing said opening watertight, said sealing element having a flexible circular diaphragm portion comprising elastic polymer material and a cylindrical pin portion comprising a rigid polymer material.

10. Sealing arrangement according to claim 9, characterized in that said diaphragm portion is attached to said rigid pin portion by chain looping of the polymer materials.

11. Sealing arrangement according to claim 10, characterized in that said pin portion is arranged vertical to and centrically in said diaphragm portion.

12. Sealing arrangement according to claim 11, characterized in that the elastic polymer material of said diaphragm portion encloses said pin portion completely or leaving both ends of said pin portion free, and in that the material of said diaphragm portion is strengthened in a connection area to said pin portion.

13. Sealing arrangement according to claim 12, characterized in that said diaphragm portion has a material thickness of 0.2 to 0.8 mm.

14. Sealing arrangement according to claim 9, characterized in that said diaphragm portion has a circumference and is connected watertight to said body by a circular ring of said body continuously over said circumference.

15. Sealing arrangement according to claim 14, characterized in that said pin portion engages at a first end into a hole arranged inside said body shutter-release-and-film-transport-control element.

16. Sealing arrangement according to claim 15, characterized in that said pin portion is designed as a solid cylinder or as a hollow cylinder.

17. Sealing arrangement according to claim 14, characterized in that said shutter-release-and-film-transport-control elements each have a hole, and said pin portion has opposed first and second ends engaged in respective said holes.

18. Sealing arrangement according to claim 17, characterized in that said shutter-release-and-film-transport-control elements define an axis, and said holes are each identical in size and disposed at an angle $\alpha$ in relation to said axis when said sealing element is in an installed position.

19. Sealing arrangement according to claim 9, characterized in that said diaphragm portion comprises styrene-butadiene and said pin portion a polystyrene.

20. Sealing arrangement according to claim 9, characterized in that said body shutter-release-and-film-transport-control element is formed by a circular thumbwheel in which a release is movable both translationally and rotationally.

21. Sealing arrangement according to claim 20, characterized in that a retaining element connected to the outer body is provided for retaining said body shutter-release-and-film-transport-control element.

22. Sealing arrangement according to claim 21, characterized in that said release has on the circumference side a radial groove in which engages a stud radially arranged on an inside of said thumbwheel for transmitting a rotational movement of said thumbwheel to said release.

23. Sealing arrangement for use with a photographic camera having a camera shutter-release-and-film-transport-control element, the sealing arrangement comprising:

an outer watertight body within which the camera can be disposed, the body having an opening;

a body shutter-release-and-film-transport-control element received by the opening, said body shutter-release-and-film-transport-control element being capable of a rotational film transport and a transversal shutter release movement; and a one-piece sealing element transmitting the shutter release and film transport movement to the camera shutter-release-and-film-transport-control element inside the body, and sealing said opening watertight, said sealing element having a flexible circular diaphragm portion comprising elastic polymer material and a cylindrical pin portion comprising a rigid polymer material, wherein the elastic polymer material of said diaphragm portion encloses said pin portion completely or leaving both ends of said pin portion free, and in that the material of said diaphragm portion is strengthened in a connection area to said pin portion.

* * * * *